(No Model.)
J. TURNER.
CORN PLANTER.
No. 251,975. Patented Jan. 3, 1882.
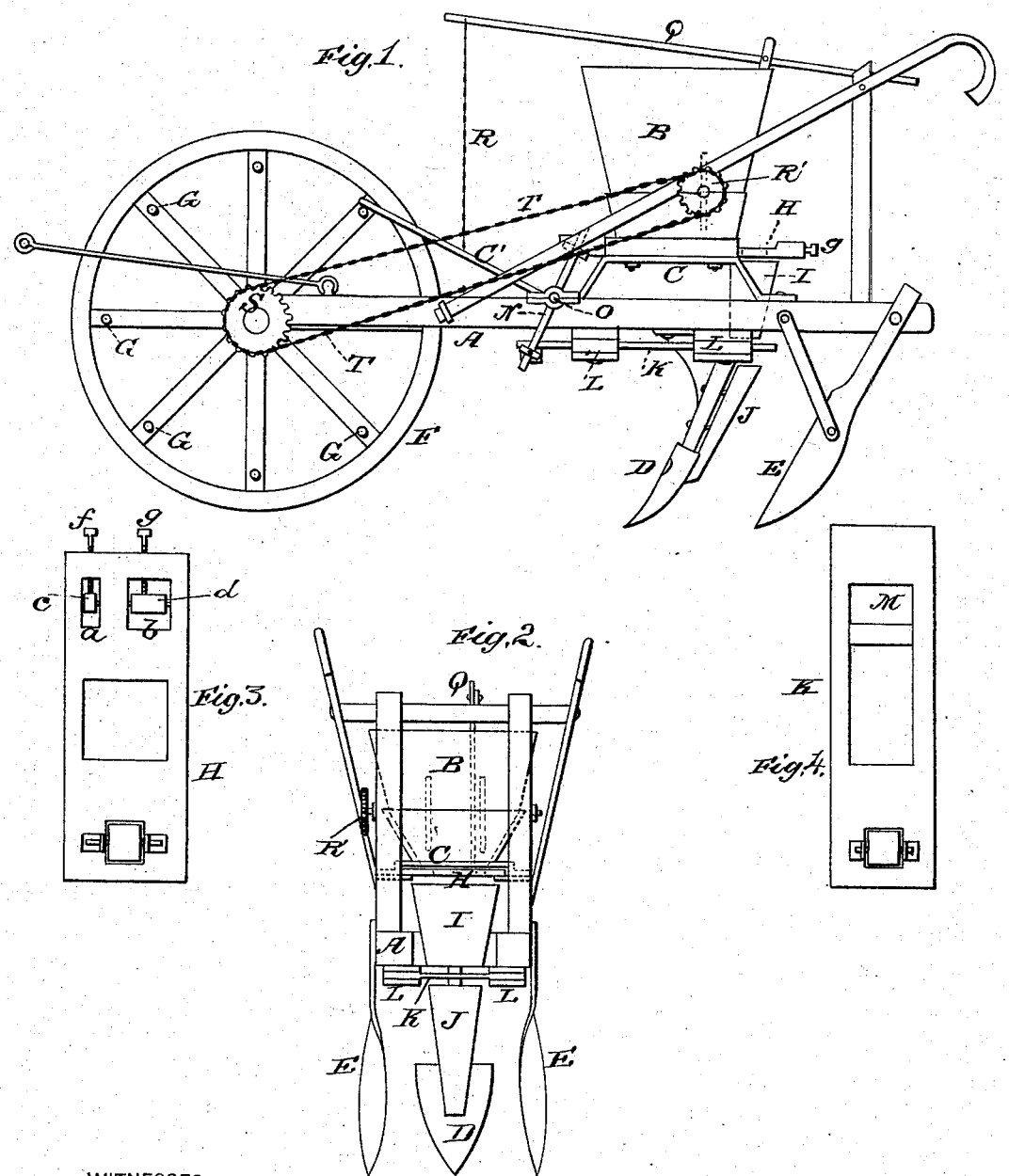
WITNESSES
INVENTOR
James Turner
ATTORNEYS

UNITED STATES PATENT OFFICE.

JAMES TURNER, OF CULPEPER, VIRGINIA.

CORN-PLANTER.

SPECIFICATION forming part of Letters Patent No. 251,975, dated January 3, 1882.

Application filed August 23, 1881. (No model.)

*To all whom it may concern:*

Be it known that I, JAMES TURNER, a citizen of the United States, resident of Culpeper, in the county of Culpeper and State of Virginia, have invented a new and valuable Improvement in Corn-Planters; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a side elevation of my invention. Fig. 2 is a rear view; and Figs. 3 and 4 are detail views of the slides.

This invention has relation to corn-planters; and it consists in the novel construction and arrangement of the oscillating lever and dropping slides, the tripping-lever, and the lever for throwing the tripping-lever out of gear with the operating-wheel, as will be hereinafter fully described, and pointed out in the claim.

Referring by letter to the accompanying drawings, A designates the frame of the planter, carrying a hopper, B, on brackets C, raised above the frame.

D designates the plow for opening the furrow, and E E are the coverers.

F is the supporting and operating wheel, provided with pins G in the sides of the spokes, near the felly of the wheel.

The bottom of the hopper B is provided with a slide, H, having feed-openings $a$ $b$, which have blocks $c$ $d$, operated by thumb-screws $f$ $g$, to regulate the quantity of seed and fertilizer to be discharged, as may be desired. The hopper B is provided with a partition, which divides it into two compartments, one for corn and the other for fertilizer. A tube, I, leads from the rear of the hopper B to the spout J in the rear of the opening-plow D. Another slide, K, secured in ways L in the under side of the frame, is provided with an opening, M, and the slides H and K are connected at their forward ends by a pivoted lever, N, on a shaft, O, having its bearings in the side rails of the frame A. To this shaft O is connected a lever, C', which is operated by the pins G as the wheel revolves to oscillate the slides H and K and drop the corn and fertilizer into the furrow, after which they are covered by the coverers.

A lever, Q, pivoted to the top of the hopper is employed to elevate the lever C', through the medium of a chain, R, connecting the two to throw the slides out of operation when desired.

By using a chain, R, the levers C' and N have an operative movement without affecting the lever Q, and at the same time they can be readily lifted by said lever.

The agitator or feed in the hopper is provided with a pulley, R', and the hub of the supporting-wheel is provided with a pulley, S, a chain, T, connecting the two pulleys to operate the agitator. The pins in the spokes regulate the distance at which the corn is to be dropped. If it is desired to increase the distance, the pins from alternate spokes may be removed. The corn and fertilizer drop from the opening in the upper slide to the lower slide, and thence through opening in the lower slide through the tube to the furrow, where they are covered by the coverers.

Having thus fully described my invention, what I claim as new, and desire to secure by Letters Patent, is—

In a corn-planter, the hopper B, having the partition, in combination with the slide H, having the openings $a$ $b$, blocks $c$ $d$, and set-screws $f$ $g$, connected to the slide K, having opening M, by the lever N on the shaft O, the lever C', chain R, lever Q, and the supporting and operating wheel F, having the pins G, constructed, arranged, and operating substantially as specified.

In testimony that I claim the above I have hereunto subscribed my name in the presence of two witnesses.

JAMES TURNER.

Witnesses:
ELIAS BENJAMIN WRENN,
JOHN RITTENHOUSE FEAGANES.